United States Patent
Rajput et al.

(10) Patent No.: US 8,892,444 B2
(45) Date of Patent: Nov. 18, 2014

(54) SYSTEMS AND METHODS FOR IMPROVING QUALITY OF USER GENERATED AUDIO CONTENT IN VOICE APPLICATIONS

(75) Inventors: Nitendra Rajput, New Delhi (IN); Kundan Shrivastava, Faridabad (IN)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 13/191,884

(22) Filed: Jul. 27, 2011

(65) Prior Publication Data

US 2013/0030814 A1    Jan. 31, 2013

(51) Int. Cl.
| G10L 21/00 | (2013.01) |
| G10L 15/20 | (2006.01) |
| H04M 1/64 | (2006.01) |
| G10L 25/60 | (2013.01) |
| G10L 25/84 | (2013.01) |
| G10L 15/22 | (2006.01) |
| H04M 3/493 | (2006.01) |

(52) U.S. Cl.
CPC ............... G10L 25/60 (2013.01); G10L 25/84 (2013.01); *H04M 3/4938* (2013.01); G10L 15/22 (2013.01)
USPC ............ 704/270.1; 704/233; 379/88.04

(58) Field of Classification Search
None
See application file for complete search history.

(56) References Cited

U.S. PATENT DOCUMENTS

| 5,526,407 | A * | 6/1996 | Russell et al. ............ 379/88.01 |
| 5,732,216 | A * | 3/1998 | Logan et al. ................. 709/203 |
| 5,915,001 | A * | 6/1999 | Uppaluru ................. 379/88.22 |
| 5,974,382 | A * | 10/1999 | Fado et al. .................... 704/270 |
| 6,292,799 | B1 * | 9/2001 | Peek et al. ........................... 1/1 |
| 6,321,267 | B1 | 11/2001 | Donaldson |
| 6,792,086 | B1 * | 9/2004 | Saylor et al. ............... 379/88.17 |
| 6,910,005 | B2 * | 6/2005 | Bartosik ..................... 704/201 |
| 7,082,397 | B2 * | 7/2006 | Cohen et al. ............. 704/270.1 |
| 7,194,069 | B1 | 3/2007 | Jones et al. |
| 7,197,461 | B1 * | 3/2007 | Eberle et al. ................. 704/275 |
| 7,260,530 | B2 | 8/2007 | Werner |
| 7,444,375 | B2 * | 10/2008 | McConnell et al. .......... 709/206 |
| 7,532,581 | B1 * | 5/2009 | Metzger et al. .............. 370/252 |
| 7,644,000 | B1 * | 1/2010 | Strom ........................ 704/278 |
| 7,689,659 | B1 | 3/2010 | Granoff et al. |
| 7,933,389 | B2 * | 4/2011 | Kumar et al. .................. 379/68 |
| 8,457,289 | B2 * | 6/2013 | Jain et al. .................. 379/93.21 |
| 2001/0032081 | A1 * | 10/2001 | Unger et al. ............... 704/270.1 |
| 2002/0054090 | A1 * | 5/2002 | Silva et al. .................... 345/747 |

(Continued)

FOREIGN PATENT DOCUMENTS

WO    0171481    9/2001

OTHER PUBLICATIONS

"MediaEval Benchmarking Initiative for Multimedia Evaluation", The 2011 Spoken Web Search Task, 1 page, available at URL: http://www.multimediaeval.org/mediaeval2011/SWS2011/ as of Mar. 8, 2011.

(Continued)

*Primary Examiner* — Brian Albertalli
(74) *Attorney, Agent, or Firm* — Ference & Associates LLC

(57) ABSTRACT

Methods and arrangements for improving quality of content in voice applications. A specification is provided for acceptable content for a voice application, and user generated audio content for the voice application is inputted. At least one test is applied to the user generated audio content, and it is thereupon determined as to whether the user generated audio content meets the provided specification.

12 Claims, 6 Drawing Sheets

(56) References Cited

U.S. PATENT DOCUMENTS

| | | | |
|---|---|---|---|
| 2009/0024720 | A1 | 1/2009 | Karray et al. |
| 2009/0138262 | A1 | 5/2009 | Agarwal et al. |
| 2010/0185648 | A1 | 7/2010 | Chauhan et al. |
| 2010/0228540 | A1 | 9/2010 | Bennett |
| 2011/0286586 | A1* | 11/2011 | Saylor et al. ............... 379/88.13 |
| 2012/0201362 | A1* | 8/2012 | Crossan et al. ............ 379/88.01 |
| 2013/0231931 | A1* | 9/2013 | Kulis et al. .................... 704/235 |

OTHER PUBLICATIONS

Agarwal, Sheetal K., et al., "Spoken Web: Creation, Navigation and Searching of VoiceSites", Intelligent User Interface 2011 Conference, Feb. 13-16, 2011, pp. 431-432, ACM, Palo Alto, California, USA.

Diao, Mamadou, et al., "Faceted Search and Browsing of Audio Content on Spoken Web", 19th International Conference on Information Knowledge and Management, Oct. 26-30, 2010, pp. 1029-1037, ACM, Toronto, Ontario, Canada.

Chauhan, Himanshu, et al., "WAV: Voice Access to Web Information for Masses", W3C Workshop 2010, May 6-7, 2010, 4 pages, New Delhi, India.

Kamvar, Maryam et al., "Say What? Why users choose to speak their web queries", Apr. 2007, 4 pages, available at URL:http://www.google.co.in/url?sa=t&source=web&cd=2&ved=0CB8QFjAB&url=http%3A%2F%2Fresearch.google.com%2Fpubs%2Farchive%2F36577.pdf&rct=j&q=speach%20query%20%2B%20spokenweb&ei=Mbl1TZWMAceVcd3Jqe8E&usg=AFQjCNHK9jkt-jZj8tu6CxcG44vwPSIwuw&cad=rja, as of Jul. 19, 2010.

Kumar, Arun, et al., "The spoken web application framework: user generated content and service creation through low-end mobiles", W4A2010—Technical, co-located with the 19th International World Wide Web Conference, Apr. 26-27, 2010, 10 pages, Raleigh, North Carolina, USA.

Mahmud, Altaf, et al., "Detecting flames and insults in text", ICON—2008, 6th International Conference on Natural Language Processing, Dec. 20-22, 2008, 11 pp., Pune, India.

Mishne, Gilad, et al., "Automatic Analysis of Call-center Conversations", CIKM '05, ACM 14th Conference on Information and Knowledge Management, Oct. 31-Nov. 5, 2005, 7 pages, Bremen, Germany.

Markines, Benjamin, et al., "Social Spam Detection", AIRWeb '09, 5th International Workshop on Adversarial Information Retrieval on the Web, Apr. 21, 2009, 8 pages, Madrid, Spain.

* cited by examiner

SYSTEMS AND METHODS FOR IMPROVING QUALITY OF USER GENERATED AUDIO CONTENT IN VOICE APPLICATIONS

BACKGROUND

The lack of internet access in many parts of the world, especially in developing countries, has given rise to voice applications with a capability for user-generated content. These permit a user to phone into a number and access voice application sites analogous to websites, yet controlled, delivered and administered via audio and voice. Voice application platforms and associated sites thus represent tremendous potential for utility but, unfortunately, significant challenges can arise in ensuring a consistent quality of user-generated audio content (UGC).

BRIEF SUMMARY

In summary, one aspect of the invention provides a method comprising: providing a specification for acceptable audio content for a voice application; inputting user generated audio content for the voice application; applying at least one test to the user generated audio content; and thereupon determining whether the user generated audio content meets the provided specification.

Another aspect of the invention provides an apparatus comprising: at least one processor; and a computer readable storage medium having computer readable program code embodied therewith and executable by the at least one processor, the computer readable program code comprising: computer readable program code configured to provide a specification for acceptable audio content for a voice application; computer readable program code configured to input user generated audio content for the voice application; computer readable program code configured to apply at least one test to the user generated audio content; and computer readable program code configured to thereupon determine whether the user generated audio content meets the provided specification.

An additional aspect of the invention provides a computer program product comprising: a computer readable storage medium having computer readable program code embodied therewith, the computer readable program code comprising: computer readable program code configured to provide a specification for acceptable content for a voice application; computer readable program code configured to input user generated audio content for the voice application; computer readable program code configured to apply at least one test to the user generated audio content; and computer readable program code configured to thereupon determine whether the user generated audio content meets the provided specification.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
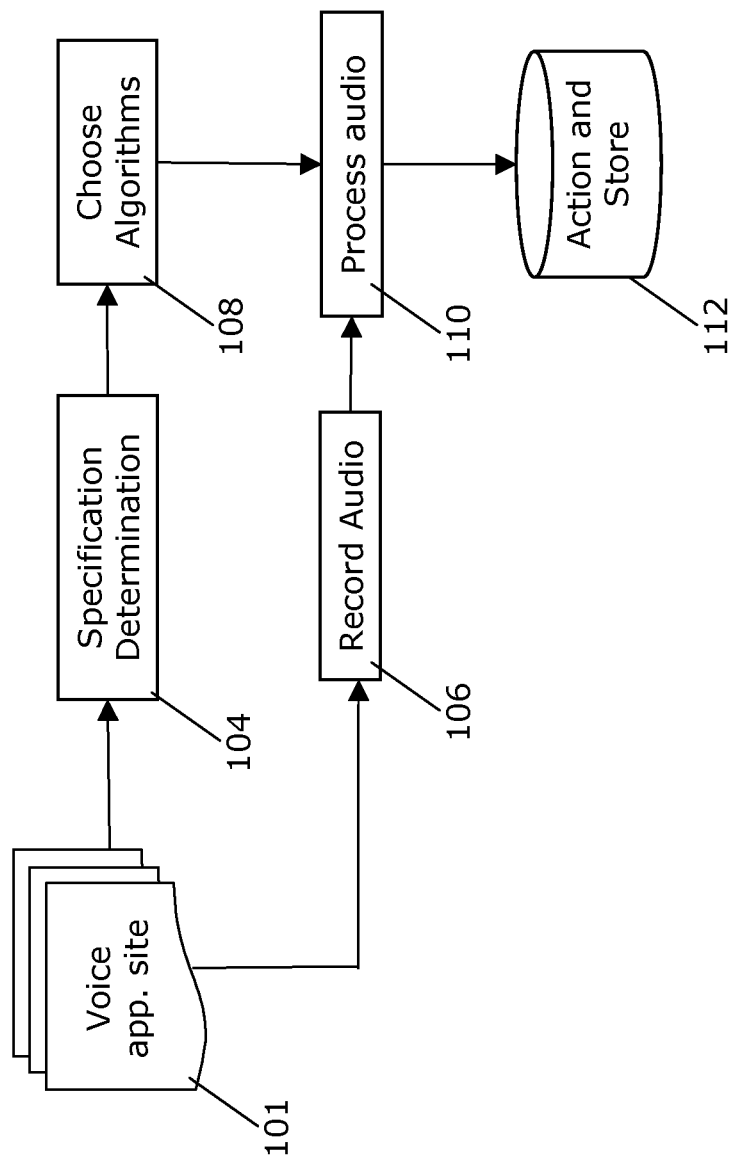
FIG. 1 schematically illustrates an overall process of specification determination, algorithm detection and action in processing audio input for a voice application.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure now turns to FIGS. 1-4. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 6 whether on a server computer, a client computer, a node computer in a distributed network, or any combination thereof.

Figure 2:
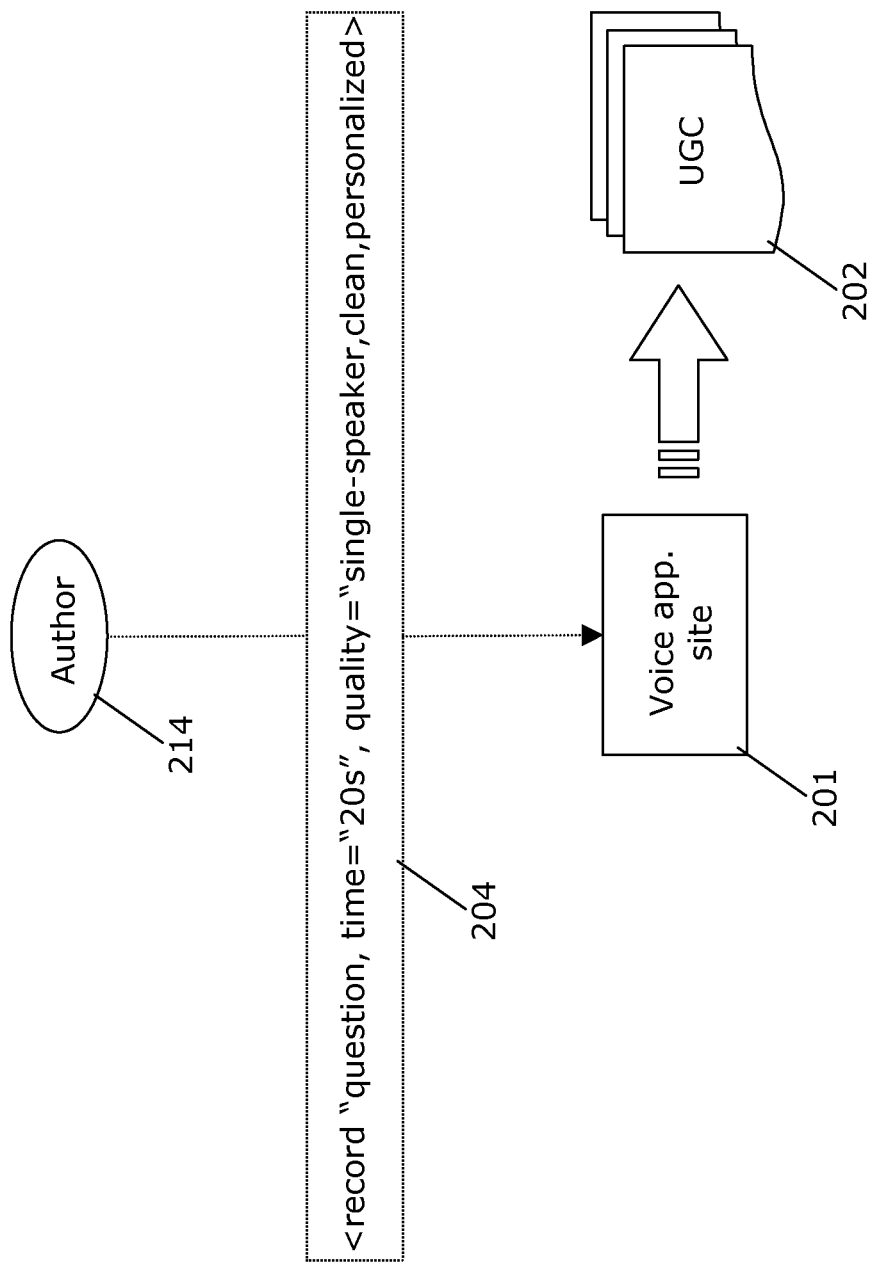
FIG. 2 schematically illustrates a specification determination step.
Figure 3:
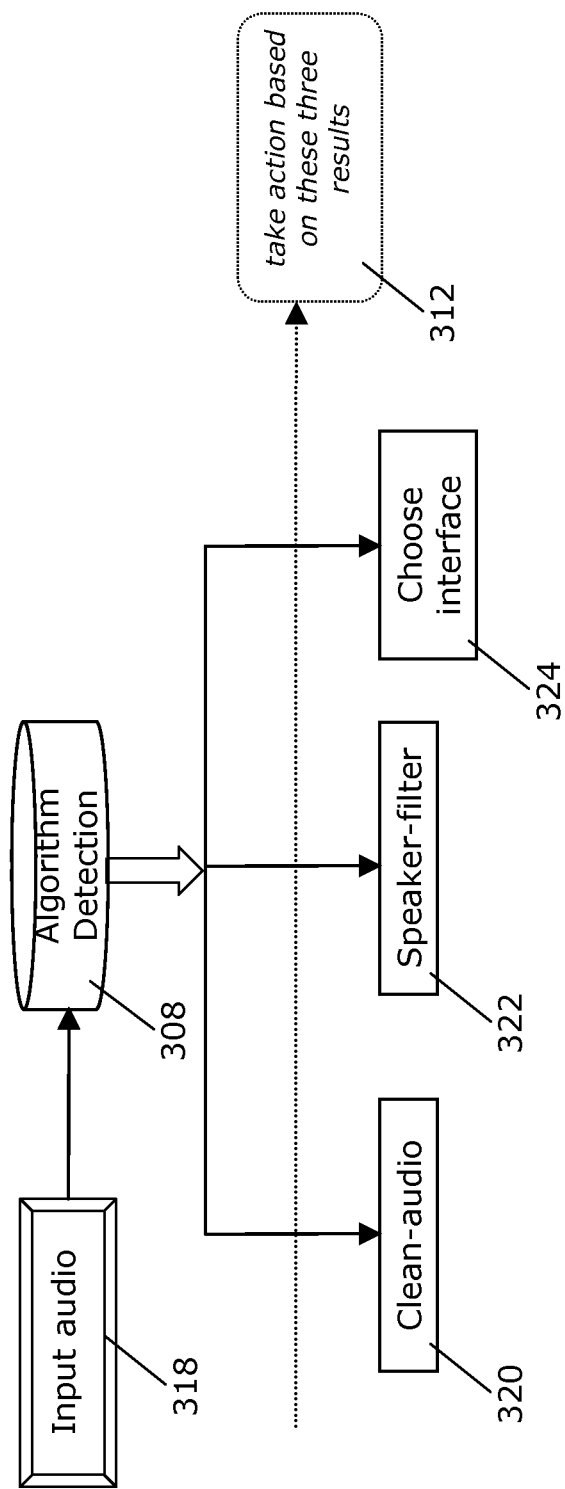
FIG. 3 schematically illustrates an algorithm detection step.
Figure 4:
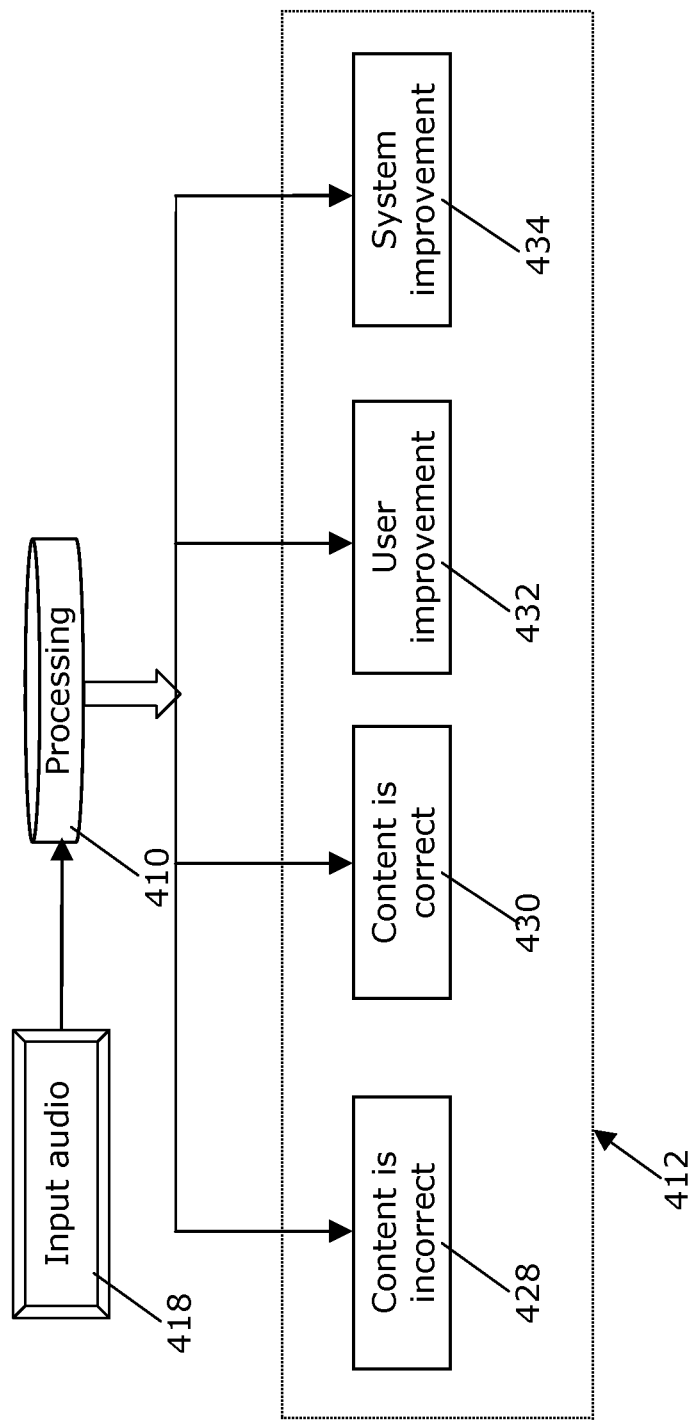
FIG. 4 schematically illustrates an action step.

To facilitate easier reference, in advancing from FIG. 1 to and through FIG. 4, a reference numeral is advanced by a multiple of 100 in indicating a substantially similar or analogous component or element with respect to at least one component or element found in at least one earlier figure among FIGS. 1-4.

Generally, the creation of audio content continues to evolve for use in new applications. One such application is the World Wide Telecom Web (WWTW), also referred to as the 'Telecom Web' or the 'Spoken Web.' The Spoken Web is a network of VoiceSites hosted on the telecom network, wherein each voice site individually comprises a voice driven application. The Spoken Web system may be viewed as a telecom network parallel to the World Wide Web (WWW) that runs on the Internet infrastructure. VoiceSites are accessed by calling the number associated with the VoiceSite, called a VoiNumber. A VoiLink is used to link the various VoiceSites to one another. A VoiceSite may be created or updated through a voice driven interface, such that a program creator may create a VoiceSite or modify an existing VoiceSite using a cellular phone. The Spoken Web is an ideal solution for a large part of the world were the population does not have access to the devices necessary to access the Internet, but cellular phone penetration is high. As a result, the use of the Spoken Web and the number of VoiceSites continue to increase. Thus, the volume of audio content associated with the Spoken Web continues to steadily expand.

Generally, the World Wide Telecom Web and interconnected voice applications (VoiceSites) and can be accessed by any voice-capable (e.g., landline or cellular) telephone. In the course of an ordinary phone call, the user interacts with a service or other application through speech or DTMF (dual tone multi frequency, or the signal to the phone company that is generated when one presses the touch keys of a telephone, which can also be referred to as "touch tone" or "telephone touch tone").

By way of further background in accordance with at least one embodiment of the invention, SWAF (Spoken Web Application Framework) can be used in creating VoiceSites. Background information on SWAF may be found in A. Kumar et al., "The Spoken Web Application Framework User Generated Content and Service Creation through low-end mobiles" in the 19th International World Wide Web Conference (co-located with the 2010 W4A Technical Conference).

In accordance with at least one embodiment of the invention, in a voice application with a capability for user generated audio content (such as VoiceSites), there is broadly contemplated herein an arrangement for detecting whether UGC is relevant and of sufficient quality for a particular site for which it is being created, while providing features to improve sound quality and offer a degree of personalization.

In accordance with at least one embodiment of the invention, a solution as broadly contemplated herein employs three main components: specification, detection and action. As shown in FIG. 1, code 101 of a voice application site (such as a VoiceSite) contains information regarding where the user generated audio content (UGC) needs to be input from the user and what the specifications of the content should be. The specification determination 104 parses this code 101 and determines the permitted specifications that need to be followed by audio recorded for the voice application site in question. This is followed by algorithm choice/detection 108 based on the specifications 104. The audio required in the voice application site is recorded by the user in step 106. Whenever such audio is recorded by any user, it is then passed on to a processing step (110). The processed audio then undergoes an appropriate action and is stored (112). Specific components of these steps, in accordance with embodiments of the invention, will be better appreciated from the discussion herebelow.

In accordance with at least one embodiment of the invention, at any voice application site, allowed content types can be specified by the site author. Thus, as shown in FIG. 2, in a specification determination step, author 214 can append such a specification 204 to his/her authored voice application site 201 such that the specification 204 is thereafter applied to incoming UGC 202 (i.e., content destined for the site 201 that is generated by any user). Generally, the specification 204 can be appended to the voice application site 201 at essentially the same time that the site 201 is generated. However, it is also conceivable to append the specification 204 retroactively (after creation of the site 201) via a mechanism or option in the site 201 itself. As such, author 214 here has the capability to specify an allowed content type for a particular piece of audio user generated audio content. Accordingly, he/she can specify different possibilities for the site 216 in general or for a particular section thereof; such possibilities can include, by way of non-restrictive example: "music-only", "no noise", "completely-natural", "only-remove-silences".

By way of an illustrative and non-restrictive example, the author 214 here appends a specification 204 indicating that permitted content at the site (such as may be recorded at a step such as step 106 in FIG. 1) will include questions that have a maximum duration of 20 seconds, only a single speaker and a clean and personalized voice. (It should be noted that while the non-restrictive example of specification 204 here refers just to "questions", another specification could be written solely for requirements of answers to the questions.) In accordance with at least one embodiment of the invention, the author 214 can employ an audio interface or visual interface (e.g., graphical user interface on a computer) to create the specification 204.

In accordance with at least one embodiment of the invention, as shown in FIG. 3, in an algorithm detection step, input audio 318, destined for a voice application site as created by a user (which itself can correspond to "record audio" 106 of FIG. 1 or UGC 202 of FIG. 2), is submitted to a detection module 308 which ascertains tests or filters that will need to be applied the audio 318. Generally, module 308 acts to detect parameters from the input audio by analyzing such aspects of the audio as audio noise, the presence of multiple people, music, stammering, abuse, etc., and thereupon "diagnoses" or determines the specific tests that would need to be applied to the audio to render it acceptable for the site (if indeed changes are needed). Abusive content can be taken to include, for example, voice intonations or patterns that correspond to inappropriate behavior, as well as words or phrases that themselves can be construed to be inappropriate or abusive. To this end, suitable emotion recognition arrangements and techniques, as well as suitable word and phrase parsing techniques, as known in the acoustic and speech processing arts, can be employed.

Here, in an illustrative and non-restrictive example, the detection module 308 determines that the following tests or filters will need to be applied to input audio 318: "clean audio" 322, "speaker filter" 322 and "choose interface" 324. Action (312) will then be undertaken on the basis of these determinations or results (320/322/324), in a manner to be better appreciated herebelow. Essentially, detection module 308 determines which tests need to be applied to incoming audio 318 in order to determine whether the audio 318 is appropriate for the voice application site in question, whereupon the results of the tests will govern which action (312) might need to be taken on the audio 318. As such, a user's specification (such as that indicated at 204 in FIG. 2) can already indicate which algorithms (e.g., 320, 322 or 324) should be applied for audio in the specific voice application site, or portion thereof, in question. Input audio 318 is then passed through algorithms (e.g., 320, 322 or 324) as detected by module 308 from a source such as a user specification (such as that indicated at 204 in FIG. 2).

In accordance with at least one embodiment of the invention, by way of an illustrative and non-restrictive example, a "clean audio" test 320 involves passing the audio 318 through a clean-audio filter and obtaining a result. Filters of this type are commonly employed in the speech processing arts and can include, for example, SNR (signal-to-noise ratio) filters. A "speaker-filter" test 322, on the other hand, involves passing the audio 318 through a speaker detection protocol and obtaining a result. To this end, a suitable speaker change detection algorithm, as known in the acoustic arts, can be used to determine when there is a change of speaker in the audio input 318 and, thereupon, how many different speakers indeed are present in the audio 318. A "choose interface" test 324 determines an interface for re-recording audio if the input audio 318 does not fulfill predetermined requirements (e.g., drawing from the example of the specification 204 of FIG. 2, is not clean and single speaker) and for appending personalization to the audio 318. In other words, "choose interface" helps determine whether an interface is required and, if so, what type it will be.

Accordingly, by way of a working example in accordance with at least one embodiment of the invention, an output of test 320 could be a binary decision that indicates whether or not the input audio 318 is "clean". If not clean, then an interface as determined by test 324 can inform the user that the audio is not clean and thus not appropriate for use in the voice application in question.

In accordance with at least one embodiment of the invention, as shown in FIG. 4, an action step involves subjecting input audio 418, having undergone algorithm detection (e.g., as described and illustrated with respect to FIG. 3) to processing 410 to determine any and all appropriate actions 412 that might need to be undertaken with respect to the voice application site in question. As such, generally speaking, actions could include presenting to the user an interface through which the user is informed if the content parameters do not match those that might be permitted for a particular content type on the voice application site in question, and additionally providing him/her with an interface to improve the quality of content by either cleaning up the audio, or adding background music (or other sound effects) to the audio, or both. Alternatively, the system can itself automatically undertake a cleaning action or adding music/sound effects, etc.

In accordance with at least one embodiment of the invention, in an illustrative and non-restrictive example as shown in FIG. 4, the processing module 410 shown in FIG. 4 can direct that any of the following specific actions 412 be undertaken: "content is incorrect" 428, "content is correct" 430, "user improvement" 432 and "system improvement" 434. For "content is incorrect" 428, the user is informed that the submitted content (input audio 418) does not meet site specifications, and is asked to re-record his/her content. For "content is correct" 430, the specification (e.g., one developed by a site author as at 204 in FIG. 2) is satisfied and the input audio 418 is posted to the site. For "user improvement" 432, the user is directed to undertake some ameliorative action, such as adding signature audio (e.g., a type of personalization) to the content (418).

In accordance with at least one embodiment of the invention, for "system improvement" 434, the system itself is directed to undertake some ameliorative action, such as adding background (e.g., music or sound effects) as a matter of relevance to the context of the voice application site in question. In other words, a purpose or category of the input audio 418 can be determined, whereupon appropriate background audio is automatically added by the system to provide auditory clues to a site user as to what the content is about. For instance, audio related to coins (e.g., a sound effect of clinking coins) can be added automatically for input audio 418 relating to money, while audio related to animals (e.g., a sound effect of chirping birds) can be added for input audio 318 relating to farms. Essentially, and by way of a non-restrictive example, a suitable automatic speech recognition mechanism can be employed here to detect keywords in the input audio 418 such as "money" or "dollars" (to thereupon trigger the adoption of a "money" sound effect) or, or "farm" or "agriculture" (to thereupon trigger the adoption of an "animal" sound effect).

It can be appreciated that, in accordance with at least one embodiment of the invention, several positive consequences can be enjoyed. If the quality of UGC in voice application sites is improved, then users will have a good intrinsic experience of listening to it. If irrelevant content is culled out, this can reduce the time required to reach relevant content, thereby providing telecom cost benefits to the user. Further, if UGC is ameliorated or embellished so as to provide "clues" in the audio (e.g., sound effects relating to the content), this can help a user better understand and appreciate the content.

Figure 5:
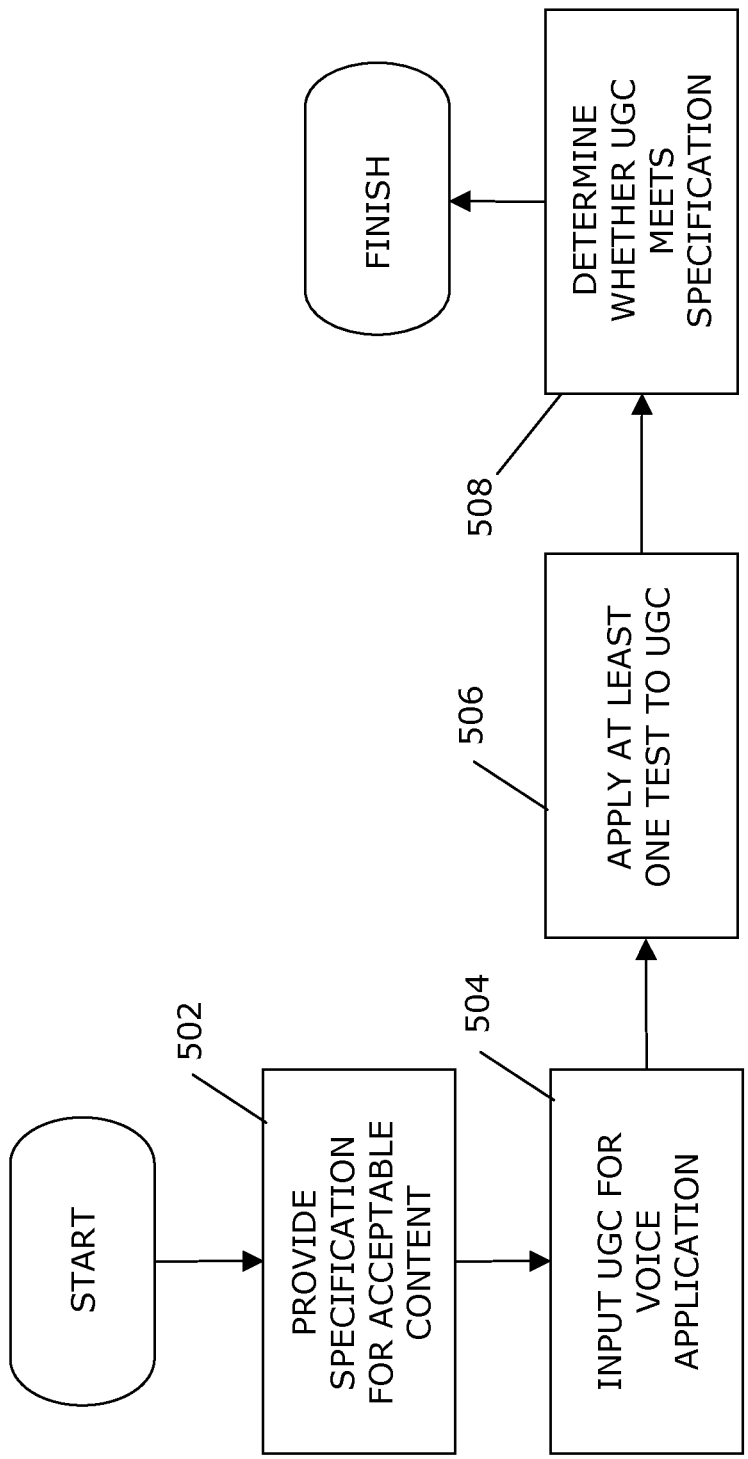
FIG. 5 sets forth a process more generally for improving quality of content in voice applications.

FIG. 5 sets forth a process more generally for improving quality of content in voice applications, in accordance with at least one embodiment of the invention. It should be appreciated that a process such as that broadly illustrated in FIG. 5 can be carried out on essentially any suitable computer system or set of computer systems, which may, by way of an illustrative and on-restrictive example, include a system such as that indicated at 12' in FIG. 6. In accordance with an example embodiment, most if not all of the process steps discussed with respect to FIG. 5 can be performed by way a processing unit or units and system memory such as those indicated, respectively, at 16' and 28' in FIG. 6.

As shown in FIG. 5, a specification is provided for acceptable content for a voice application (502), and user generated audio content for the voice application is inputted (504). At least one test is applied to the user generated audio content (506), and it is thereupon determined as to whether the user generated audio content meets the provided specification (508).

Figure 6:
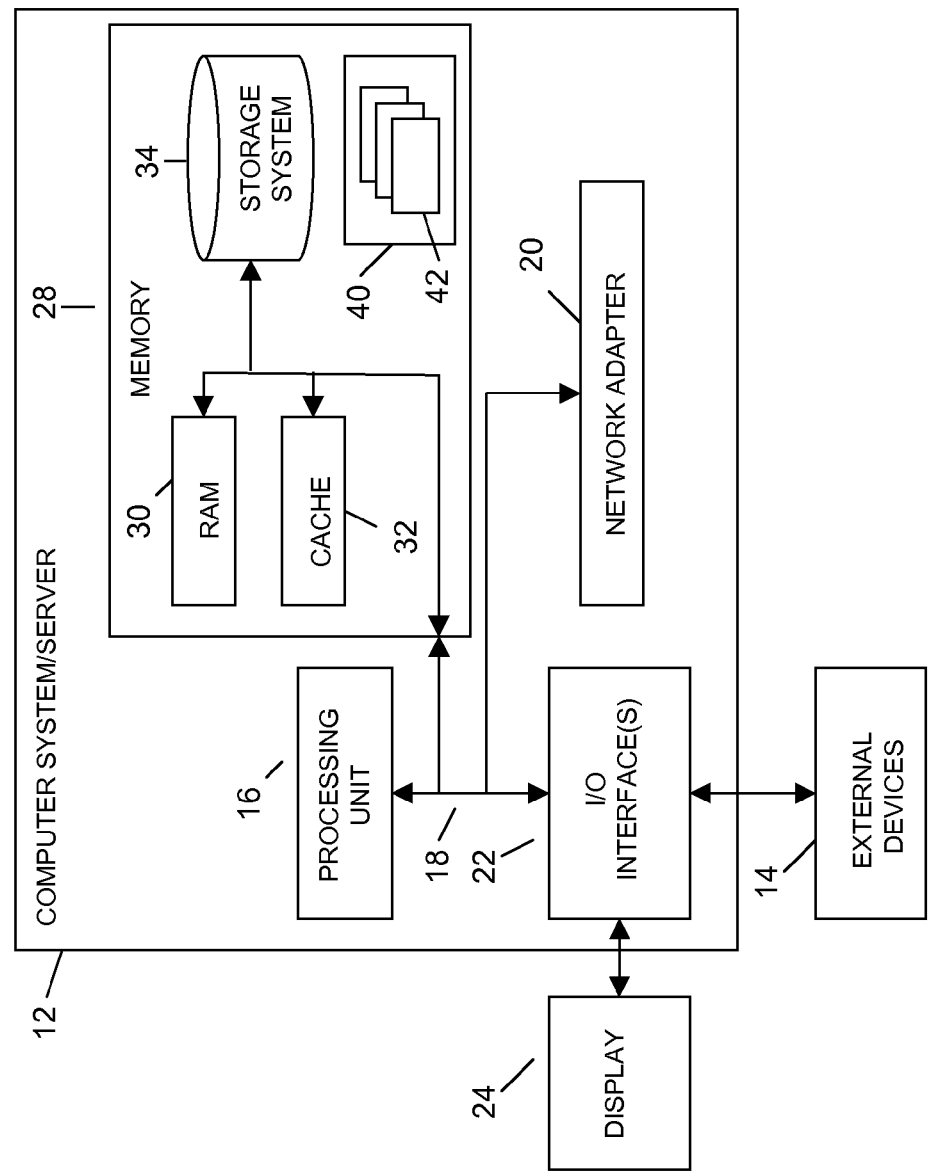
FIG. 6 illustrates a computer system.

Referring now to FIG. 6 a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
   at least one processor; and
   a computer readable storage medium having computer readable program code embodied therewith and executable by the at least one processor, the computer readable program code comprising:
   computer readable program code configured to permit an author to create a voice site for a telecom voice application, the voice site having a capability for accepting user generated audio content;
   computer readable program code configured to provide a specification for acceptable user generated audio content for the voice site;
   computer readable program code configured to input user generated audio content for the voice application;
   computer readable program code configured to apply at least one test to the inputted user generated audio content; and
   computer readable program code configured to thereupon determine whether the inputted user generated audio content meets the provided specification, and accept the user generated audio content into the voice site if the user generated audio content meets the provided specification.

2. A computer program product comprising:
   a computer readable storage medium having computer readable program code embodied therewith, the computer readable program code comprising:
   computer readable program code configured to permit an author to create a voice site for a telecom voice application, the voice site having a capability for accepting user generated audio content;
   computer readable program code configured to provide a specification for acceptable user generated audio content for the voice site;
   computer readable program code configured to input user generated audio content for the voice application;
   computer readable program code configured to apply at least one test to the inputted user generated audio content; and
   computer readable program code configured to thereupon determine whether the inputted user generated audio content meets the provided specification, and accept the user generated audio content into the voice site if the user generated audio content meets the provided specification.

3. The computer program product according to claim 2, wherein said computer readable program code is further configured to prompt a regeneration of the user generated audio content if the user generated audio content does not meet the provided specification.

4. The computer program product according to claim 2, wherein said computer readable program code is further configured to prompt a user addition to the user generated audio content.

5. The computer program product according to claim 4, wherein the user addition comprises user-specific signature audio.

6. The computer program product according to claim 2, wherein said computer readable program code is further configured to append an addition to the user generated audio content, based on at least one characteristic of the user generated audio content.

7. The computer program product according to claim 6, wherein the addition comprises background audio.

8. The computer program product according to claim 2, wherein said computer readable program code is further configured to determine the at least one test responsive to the provided user specification.

9. The computer program product according to claim 2, wherein said computer readable program code is further configured to a test to determine whether the user generated audio content is clean.

10. The computer program product according to claim 9, wherein, responsive to determining that the user generated audio content is not clean, said computer readable program code is further configured to apply a test for choosing whether an interface is subsequently required for reprocessing the user generated audio content.

11. The computer program product according to claim 2, wherein said computer readable program code is configured to apply a test to determine the presence of more than one speaker.

12. The computer program product according to claim 2, wherein said computer readable program code is configured to apply a test for choosing whether an interface is subsequently required for reprocessing the user generated audio content.

* * * * *